(12) United States Patent
Bae

(10) Patent No.: US 12,172,851 B2
(45) Date of Patent: Dec. 24, 2024

(54) CUTTING SYSTEM

(71) Applicant: NPS CO.,LTD., Cheongju-si (KR)

(72) Inventor: Seong Ho Bae, Daejeon (KR)

(73) Assignee: NPS CO.,LTD, Cheongju-si (KR)

( * ) Notice: Subject to any disclaimer, the term of this patent is extended or adjusted under 35 U.S.C. 154(b) by 745 days.

(21) Appl. No.: 17/386,071

(22) Filed: Jul. 27, 2021

(65) Prior Publication Data

US 2022/0033195 A1 Feb. 3, 2022

(30) Foreign Application Priority Data

Jul. 28, 2020 (KR) .................. 10-2020-0094118
Jun. 10, 2021 (KR) .................. 10-2021-0075725
Jul. 23, 2021 (KR) .................. 10-2021-0097309

(51) Int. Cl.
*B65G 47/90* (2006.01)
*B23K 26/38* (2014.01)

(52) U.S. Cl.
CPC ............ *B65G 47/90* (2013.01); *B23K 26/38* (2013.01); *B65G 2201/0258* (2013.01)

(58) Field of Classification Search
CPC ............ B65G 47/90; B65G 2201/0258; B65G 13/00; B65G 35/00; B65G 41/003; B65G 43/08; B65G 47/91; B65G 61/00; B65G 2203/0258; B65G 2203/042; B23K 26/38; B23K 37/047; B23K 26/702

See application file for complete search history.

(56) References Cited

U.S. PATENT DOCUMENTS

2011/0104742 A1* 5/2011 Fox ................ G01N 1/30
                                                435/309.1
2019/0340843 A1* 11/2019 McCarson .......... G06F 18/24

FOREIGN PATENT DOCUMENTS

| CN | 104648931 A | 5/2017 |
| CN | 109014585 A | 12/2018 |
| JP | 2002-103416 A | 4/2002 |
| JP | 2014-083594 A | 5/2014 |
| JP | 2017-109284 A | 6/2017 |
| KR | 10-2019-0128878 A | 11/2019 |
| WO | 2018/105824 A1 | 6/2018 |

\* cited by examiner

*Primary Examiner* — Robert G Bachner
(74) *Attorney, Agent, or Firm* — Bridgeway IP Law Group, PLLC; Jihun Kim

(57) ABSTRACT

Disclosed is a cutting system, which includes: a feed unit to supply a plurality of pre-loaded trays in sequential order; a loading unit to load the tray supplied from the feed unit with a subject to be processed ("subject"); a storage unit to load the plurality of trays loaded with the subjects in multiple stages to temporally store the same, followed by sequentially re-supplying the subjects in accordance with a change in formation of the product; a machining unit to cut the subject delivered from the storage unit with laser so as to form the product; and a recovery unit that measures a weight of the product formed in the machining unit and recovers the same. According to the present invention as described above, a cutting process to cut the subject so as to form a product and a weight-measuring process to measure a weight of the formed product may be successively executed in a single line, thereby enhancing productivity of the product.

15 Claims, 15 Drawing Sheets

[FIG. 1]
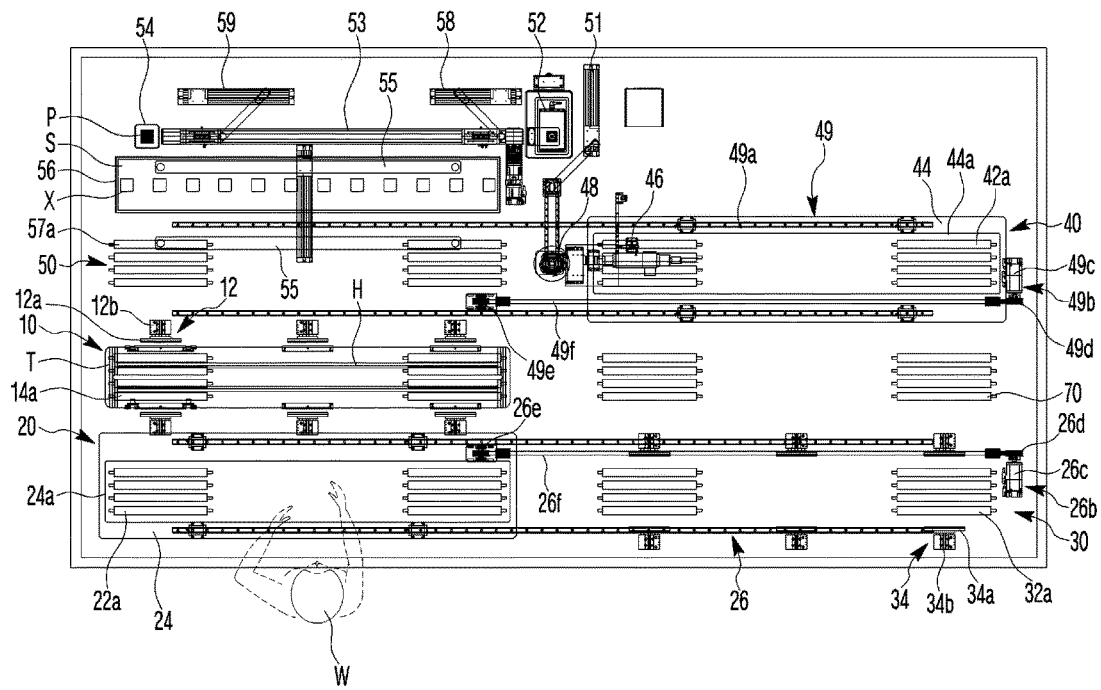

[FIG. 2]
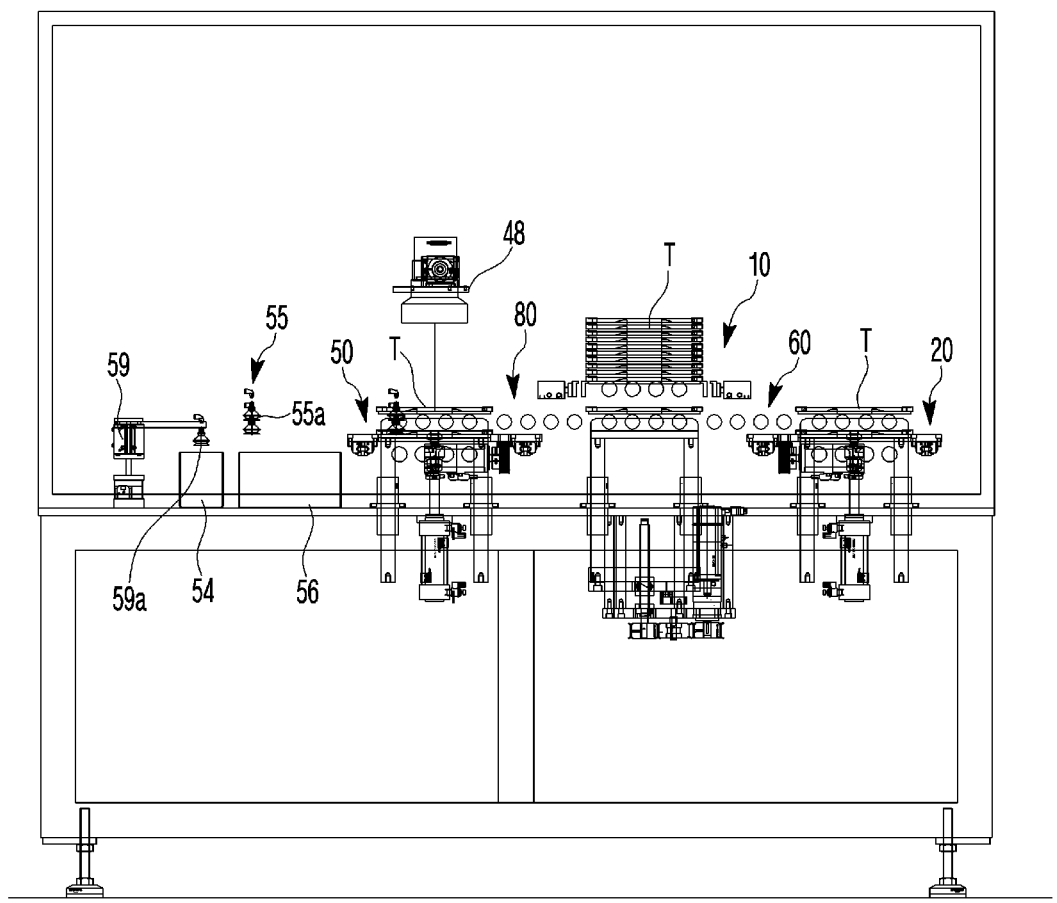

[FIG. 3]
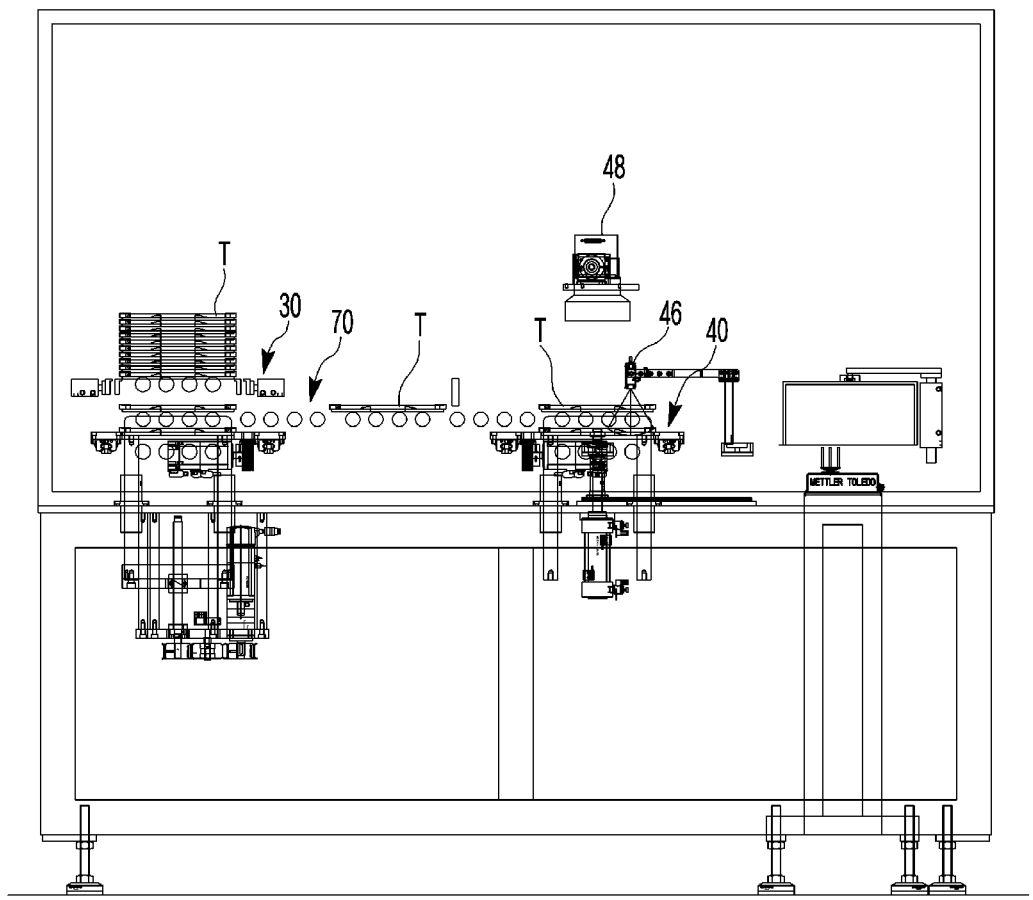

[FIG. 4]
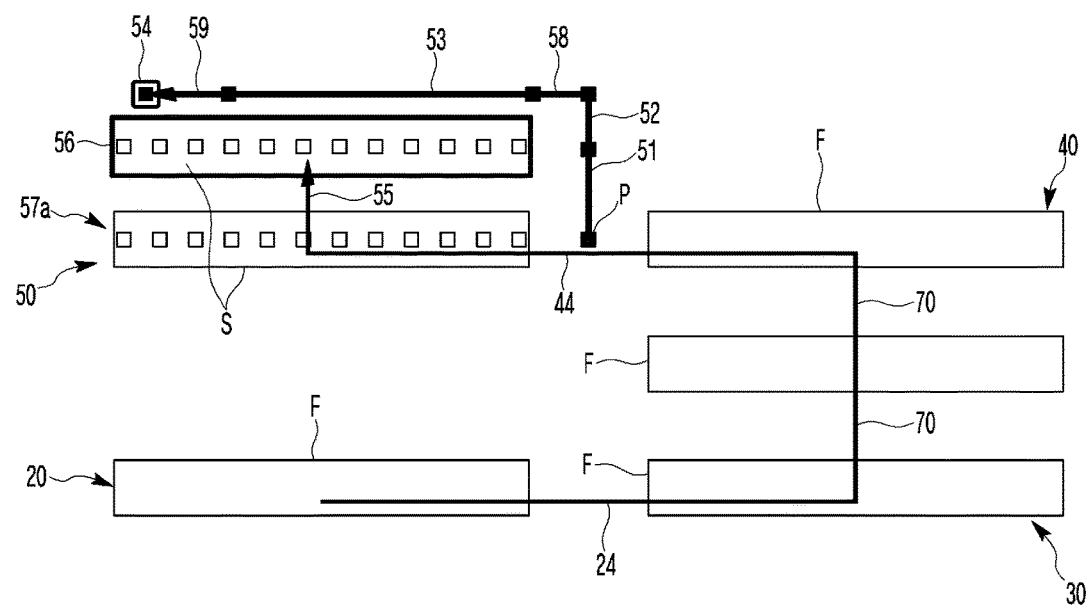

[FIG. 5]
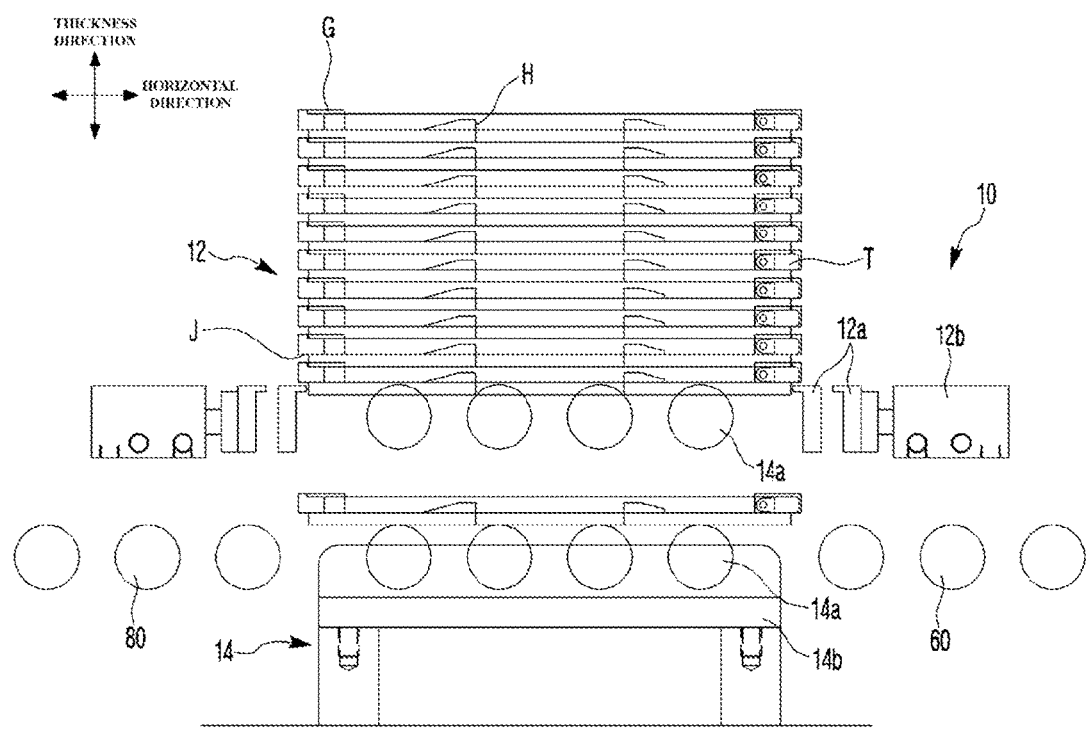

[FIG. 6]
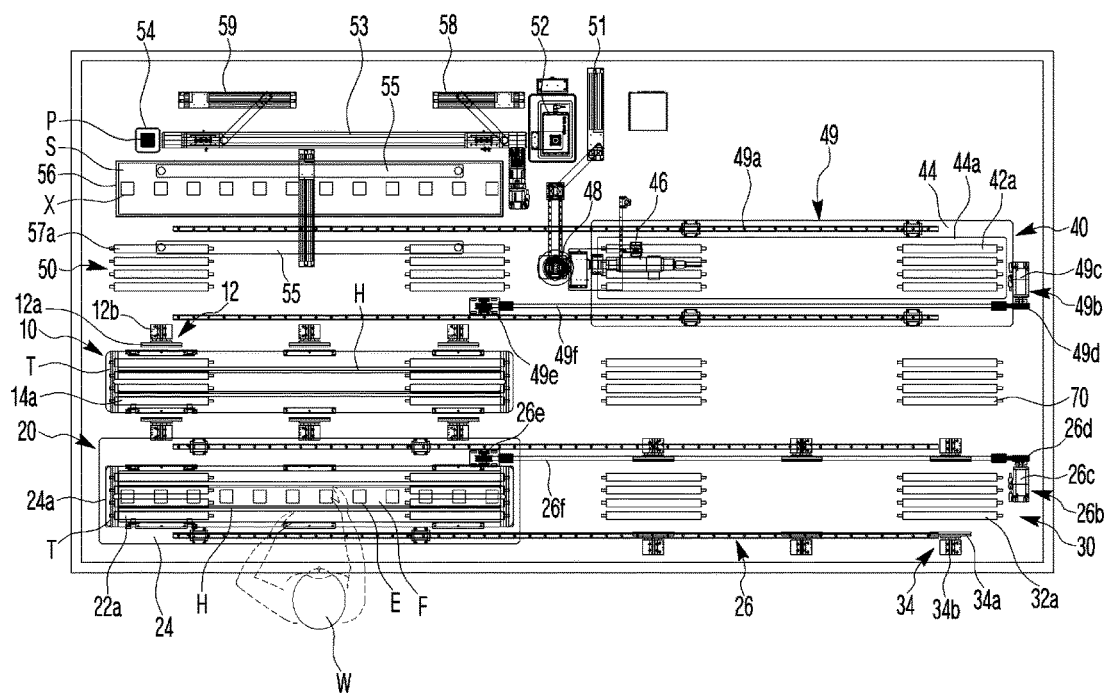

[FIG. 7]
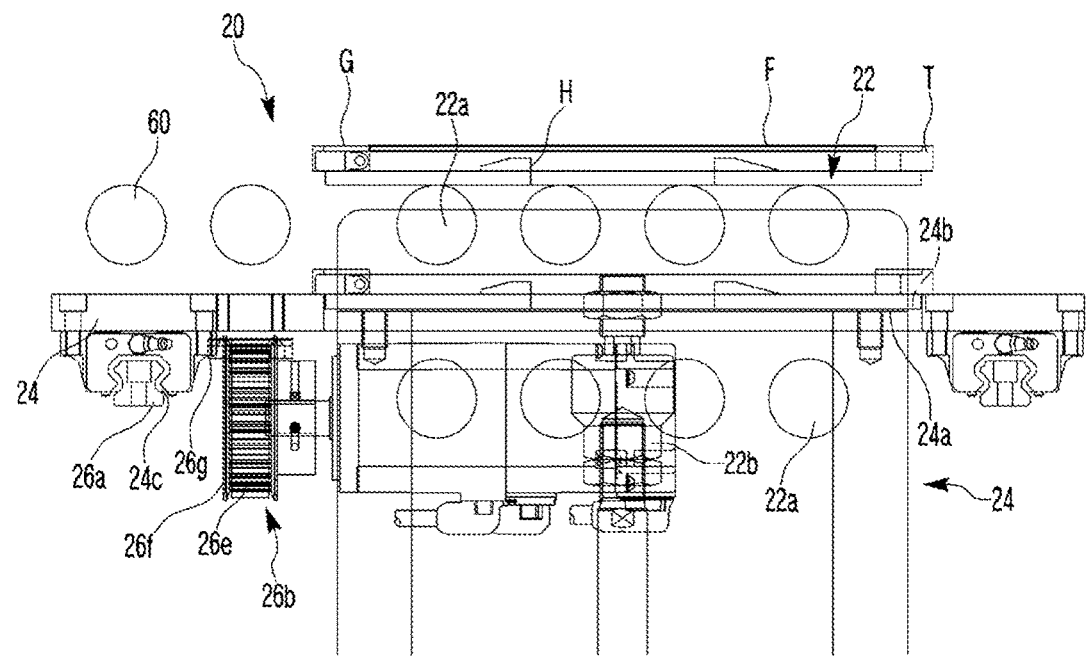

[FIG. 8]
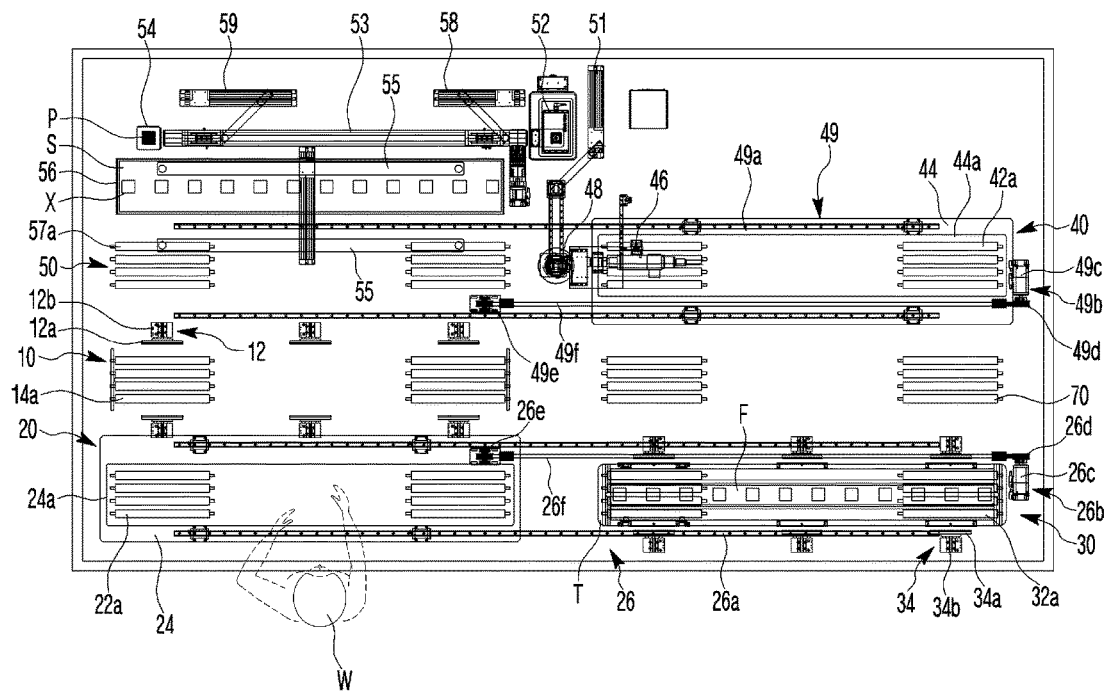

[FIG. 9]
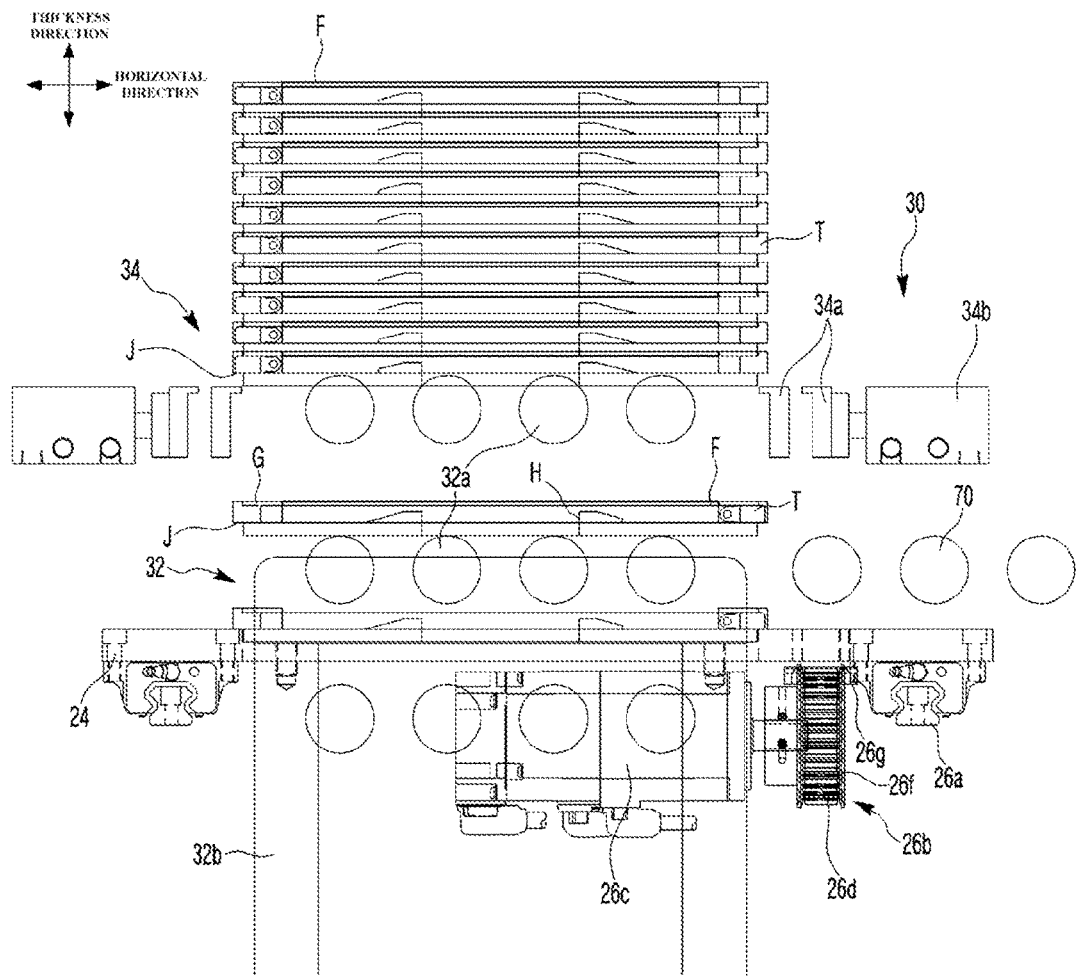

[FIG. 10]
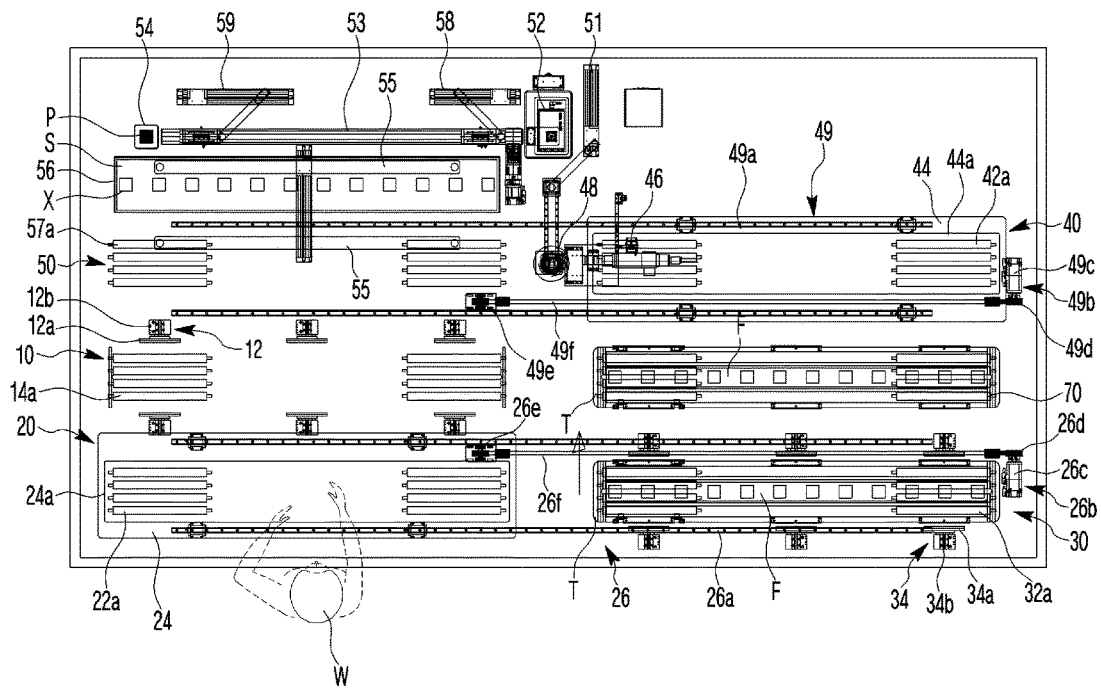

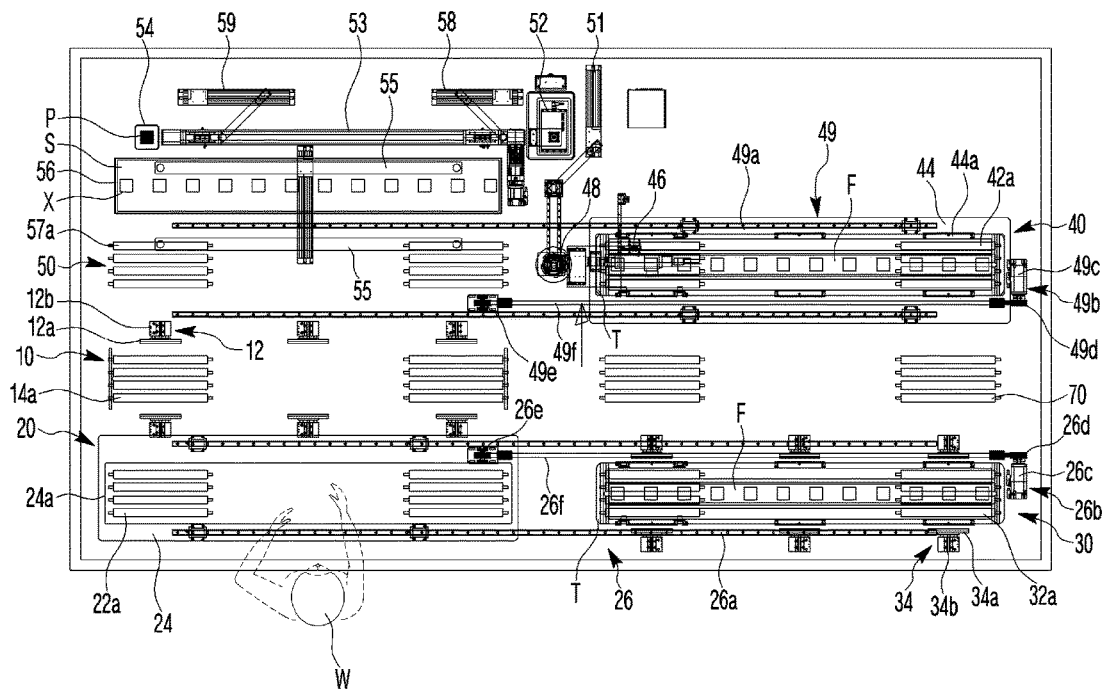
[FIG. 11]

[FIG. 12]
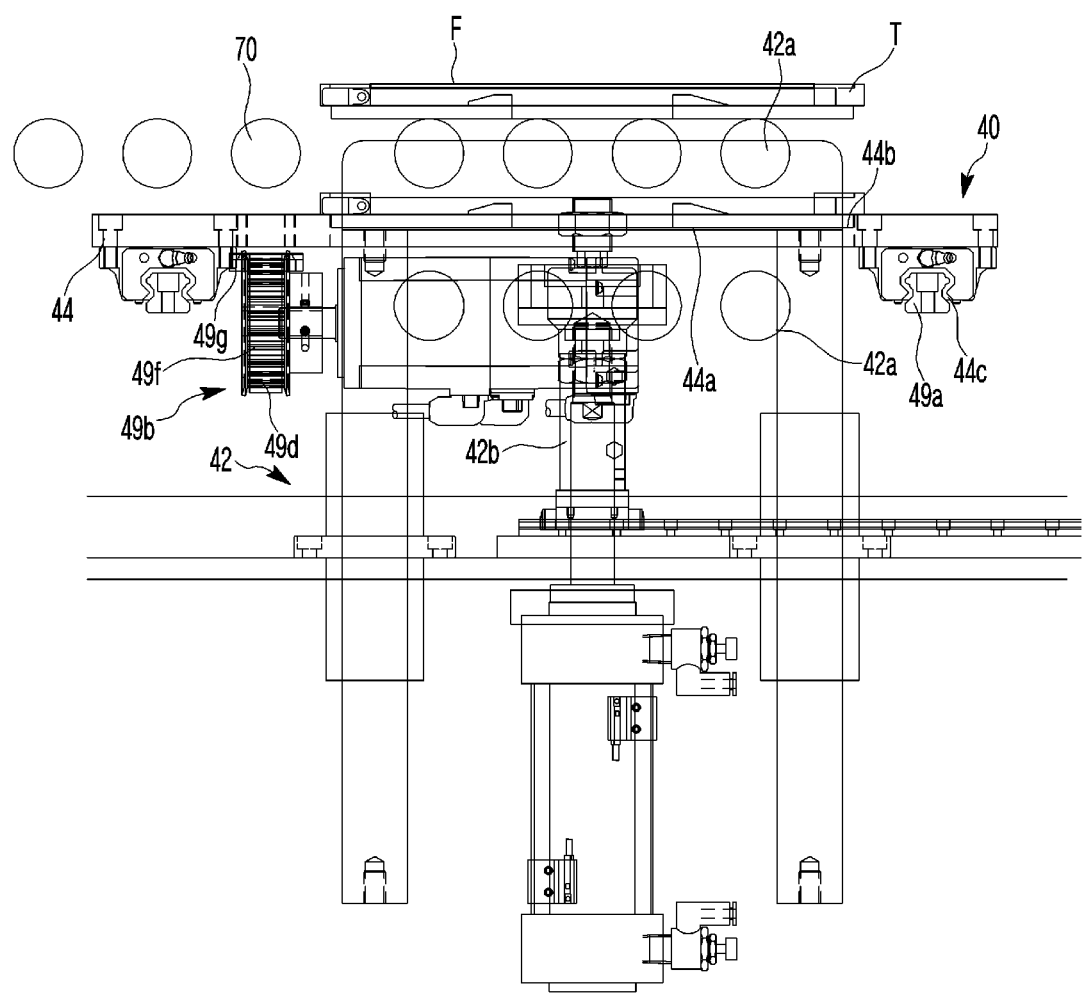

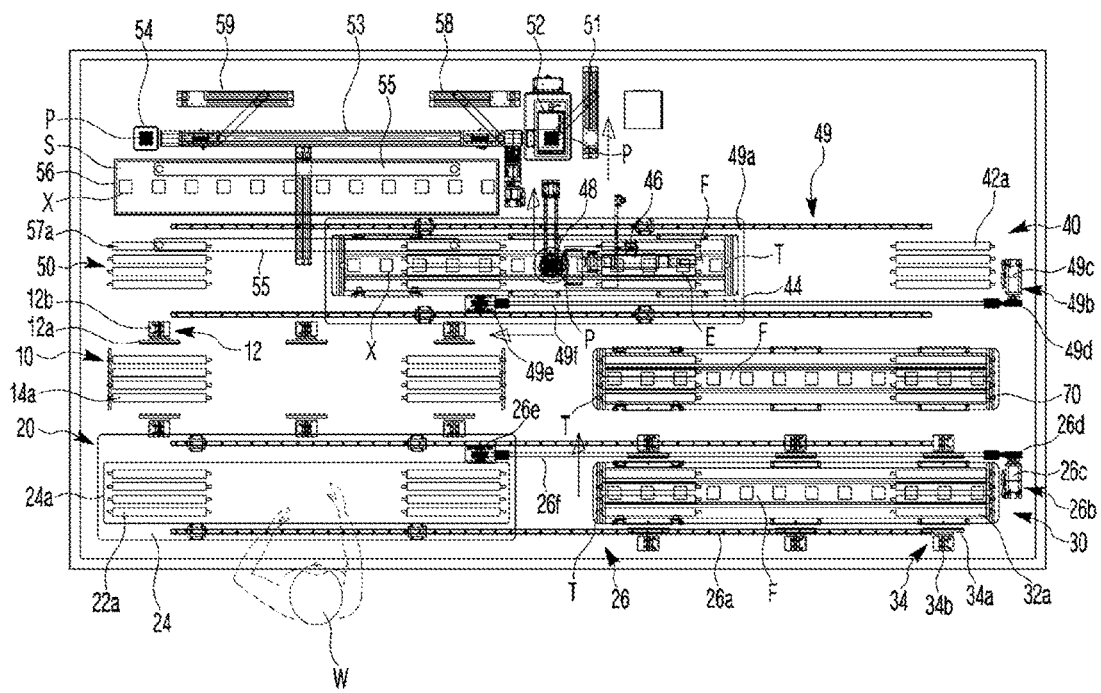
[FIG. 13]

[FIG. 14]
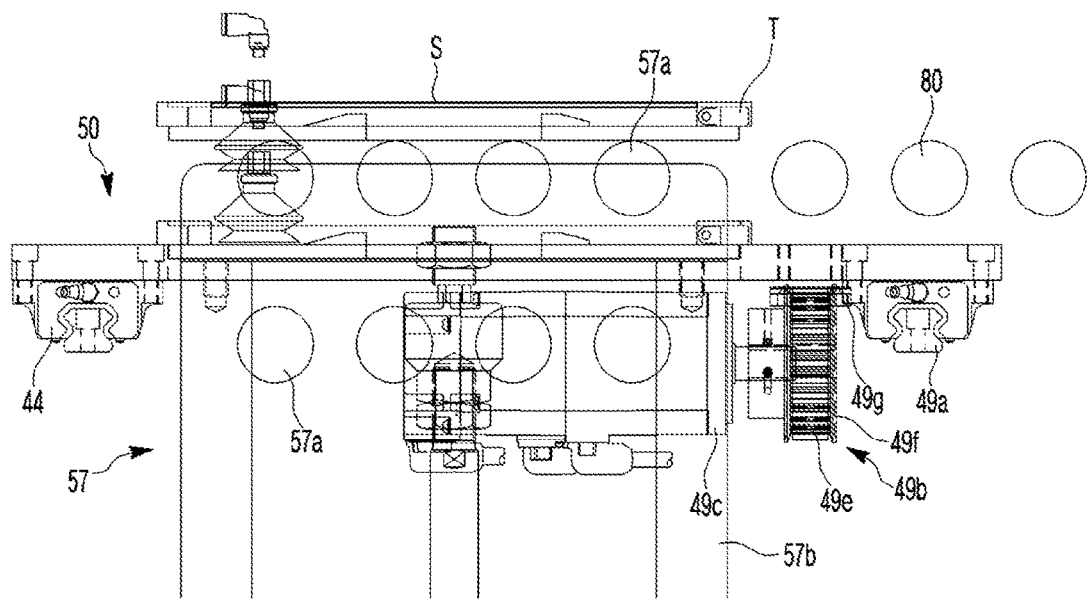

[FIG. 15]
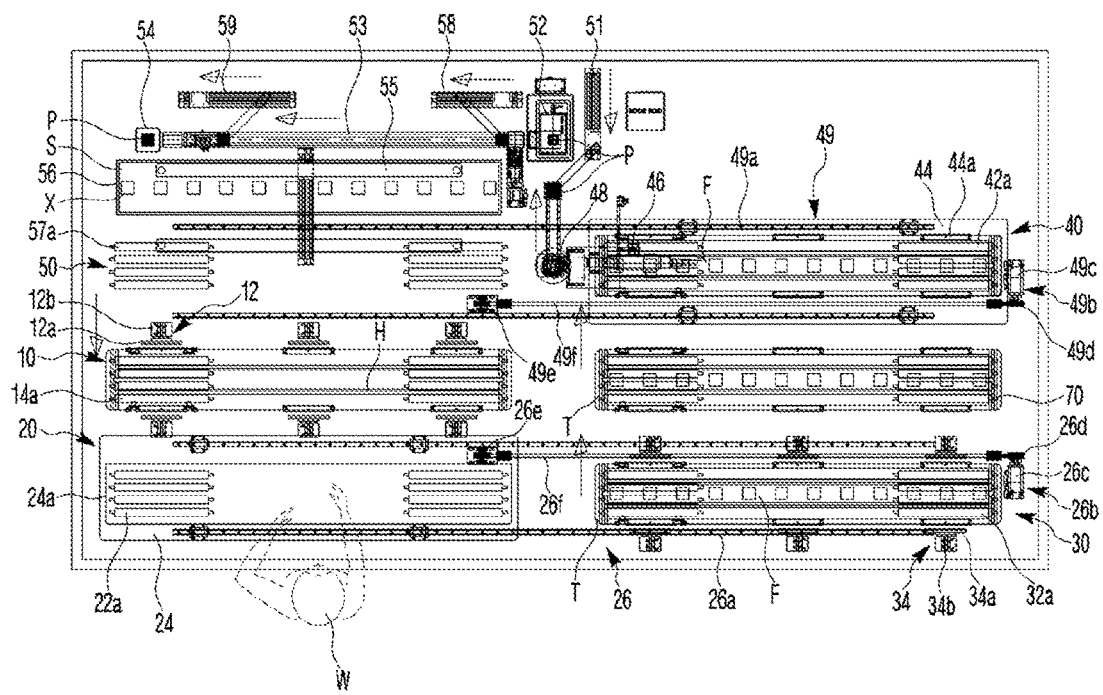

CUTTING SYSTEM

CROSS-REFERENCE TO RELATED APPLICATION

This application claims priority to Korean Patent Application No. 10-2020-0094118, filed on Jul. 28, 2020, Korean Patent Application No. 10-2021-0075725, filed on Jun. 10, 2021, and Korean Patent Application No. 10-2021-0097309, filed on Jul. 23, 2021, in the Korean Intellectual Property Office, the disclosure of which is incorporated herein by reference.

BACKGROUND OF THE DISCLOSURE

Field of the Disclosure

The present disclosure relates to a cutting system for executing a cutting process to cut a subject to be processed and to produce a sheet type product and a measurement process to measure a weight of the product.

Description of the Related Art

In recent years, sheet type products are used in diverse industrial applications. In general, a sheet type product is manufactured by a cutting process to cut a film or other subjects to be processed using a cutter.

As such, the sheet type product manufactured as described above often has irregular weight due to irregularity in thickness of a subject to be processed ("subject") or other causes. Such irregularity in weight of the sheet type product may become a cause of deterioration in quality. Therefore, after manufacturing a sheet type product, a process of weight measuring to determine a weight of the sheet type product is required.

Heretofore, no production apparatus to execute the cutting process and the weight-measuring process in a single process line has been proposed. Therefore, after conducting the cutting process using a cutting apparatus, the weight-measuring process should be conducted by a weight measurement apparatus provided separately from the cutting apparatus. Accordingly, there are conventional problems including increase in installation area and expenses due to separate installation of the cutting apparatus and the weight measurement apparatus, and deterioration in productivity of products due to a long time required to execute both of the cutting process and the weight-measuring process.

SUMMARY OF THE DISCLOSURE

Technical Problem

The present disclosure has been proposed to overcome the aforementioned problem in the art, and it is an object of the present disclosure to provide a cutting system with improved structure in order to execute both of a cutting process and a weight-measuring process in bulk on a single line.

Technical Solution

In order to solve the above problems, the cutting system according to a preferred embodiment of the present invention may be a cutting system to cut a subject to be processed so as to separately (or divisionally) form products from the subject, which includes: a feed unit to supply a tray; a loading unit to which the tray is delivered from the feed unit, wherein the subject is loaded on to the tray; a machining unit to which the tray is delivered from the loading unit, wherein the subject loaded to the tray is cut to form a product; and a recovery unit to which the tray is delivered from the machining unit, wherein a weight of the product is measured, followed by recovering the tray and the product.

Preferably, the cutting system may further be provided with a storage unit, to which the tray is delivered from the loading unit, wherein the tray loaded with the subject is temporarily stored and then delivered to the machining unit in accordance with a progress in formation of the product.

Preferably, the feed unit may be provided with a first tray loader that loads a plurality of trays in multiple stages or discharges the trays in sequential order; and a first tray lift that moves the tray discharged from the first tray loader up and down and conveys the same.

Preferably, the first tray lift may include: a first lift roller to support and convey the tray; and a first lift member to move the first lift roller up and down.

Preferably, the loading unit may include: a second tray lift to move the tray delivered from the first tray lift up and down and convey the same; a shuttle in which the tray delivered from the second tray lift is seated; and a first shuttle conveying member ("conveyer") that, when the subject is loaded from the loading unit to the tray, conveys the first shuttle to the storage unit, while conveying the first shuttle to the loading unit if the tray is delivered to the storage unit.

The second tray lift may include: a second lift roller to support and convey the tray delivered from the first tray lift; and a second lift member to move the second lift roller up and down. Further, the first shuttle may include: a through-hole through which the second lift roller can pass; and a seating groove in which the tray seated on the second lift roller is seated while being separated from the second lift roller, when the second lift roller descends to pass through the through-hole.

Preferably, the storage unit includes a third tray lift to move the tray delivered from the first shuttle up and down and convey the same; and a second tray loader that is loaded with the trays separated from the first shuttle in multiple stages, or discharges the same in sequential order, in accordance with a progress in formation of the product, wherein the third tray lift conveys the tray discharged from the second tray loader toward the machining unit.

Preferably, the second tray lift includes: a third lift roller to support and convey the tray; and a third lift member to move the third lift roller up and down so as to pass through the through-hole, wherein the third lift member moves the third lift roller upward such that, when the first shuttle reaches the storage unit, the third lift roller passes through the through-hole and is seated on the third roller while being separated from the seating groove.

Preferably, the machining unit includes: a fourth tray lift to move the tray delivered from the storage unit up and down and convey the same; a second shuttle in which the tray delivered from the fourth tray lift is seated; and a second shuttle conveyer that conveys the second shuttle to the recovery unit when the tray is seated in the second shuttle in the machining unit, while conveying the second shuttle to the machining unit when the tray is delivered to the recovery unit.

Preferably, the fourth tray lift includes: a fourth lift roller to support and convey the tray; and a fourth lift member to move the fourth lift roller up and down. Further, the second shuttle may include: a through-hole through which the fourth lift roller passes; and a seating groove configured such that, when the fourth lift roller descends to pass through the through-hole, the tray seated on the fourth lift roller is separated from the fourth lift roller and then is seated in the through-hole.

Preferably, the machining unit is further provided with a barcode reader that is mounted on a conveying pathway of the second shuttle conveyed toward the recovery unit from the machining unit, and reads a barcode pre-marked on the subject so as to collect information on the subject.

Preferably, the machining unit is provided with a laser machine which is mounted on a conveying pathway of the second shuttle conveyed toward the recovery unit from the machining unit and cuts the subject with a laser to divisionally form the same from the subject.

Preferably, the recovery unit is provided with: a product unloader which is mounted on the conveying pathway of the second shuttle and separates the product from scraps of the subject remaining after formation of the product, followed by conveying the same; and a weight measuring member to measure a weight of the product delivered from the product unloader.

Preferably, the recovery unit is further provided with a product loading container in which the product delivered from the weight measuring member is loaded.

Preferably, the recovery unit is further provided with a scrap unloader which is mounted on the conveying pathway of the second shuttle, and takes and conveys the scrap; and a scrap loading container in which the scrap delivered from the scrap unloader is loaded.

Preferably, the recovery unit is further provided with a fifth tray lift to move the tray delivered from the second shuttle and convey the same.

Preferably, the fifth tray lift includes: a fifth lift roller to support and convey the tray; and a fifth lift member to move the fifth lift roller up and down in order to pass through the through-hole, wherein the fifth lift member moves the fifth lift roller upward so that, when the second shuttle reaches the recovery unit, the fifth lift roller passes through the through-hole, and the tray is seated on the fifth roller passing through the through-hole while being separated from the seat groove.

Preferably, the fifth lift roller conveys the tray toward the feed unit when the tray separated from the seating groove is seated on the fifth lift roller.

Advantageous Effects

The present invention relates to a cutting system and has the following effects:

First, the cutting system of the present invention may be provided to successively execute a cutting process to cut a subject to be processed with a laser and a weight measuring process to measure a weight of the formed product in a single line. According to the present invention as described above, as compared to a case where a cutting apparatus for the cutting process and a weight measurement device are separately provided, a system installation area and expenses may be reduced, while shortening a time required for cutting and weight measurement, thereby enhancing productivity.

Second, according to the present invention, after supplying a subject to be processed from a feed unit, a tray in which the subject is loaded may pass through a product machining and inspection line, followed by being automatically recovered into the feed unit, whereby productivity may be further enhanced.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a schematic configuration of a cutting system according to a preferred embodiment of the present invention.

FIG. 2 is a left side view of the cutting system shown in FIG. 1.

FIG. 3 is a right side view of the cutting system shown in FIG. 1.

FIG. 4 schematically illustrates pathways of conveying a subject to be processed, a product and scrap.

FIG. 5 illustrates a schematic configuration of the feed unit shown in FIG. 2.

FIG. 6 is a view illustrating a method for conveying a tray from the feed unit to the loading unit, as well as a method for loading the tray conveyed to the loading unit with a subject to be processed.

FIG. 7 illustrates a schematic configuration of the loading unit shown in FIG. 2.

FIG. 8 is a view illustrating a method for conveying the tray in which the subject was loaded to the storage unit.

FIG. 9 illustrates a schematic configuration of the storage unit shown in FIG. 3.

FIGS. 10 and 11 illustrate a method for conveying the tray discharged from the storage unit to the machining unit.

FIG. 12 illustrates a schematic configuration of the machining unit shown in FIG. 3.

FIG. 13 illustrates a method for formation of a product by laser-cutting the subject and a method for recovery of the same.

FIG. 14 illustrates a schematic configuration of the recovery unit shown in FIG. 2.

FIG. 15 illustrates a method for measuring a weight of the product and a method for recovery of the tray, the product and the scrap.

DETAILED DESCRIPTION OF THE DISCLOSURE

Hereinafter, some embodiments of the present invention will be described in detail with reference to exemplary drawings. It should be noted that, with regard to addition of reference numerals to the constituent elements of the drawings, the same constituent elements are denoted by the same reference numerals even though they are shown in different drawings. Further, in the following description of the present invention, a detailed description of known functions and configurations incorporated herein will be omitted when it may make the subject matter of the present invention rather unclear.

Further, with regard to description of the components of the present invention, terms such as first, second, A, B, (a), and (b) may be used. These terms are intended to distinguish the constitutional elements from other constitutional elements, and the terms do not limit the nature, turn or order of the constitutional elements. Unless otherwise defined, all terms used herein, including technical or scientific terms, have the same meaning as commonly understood by one of ordinary skill in the art to which this invention belongs ("those skilled in the art"). Terms such as those defined in commonly used dictionaries should be construed as meaning consistent with the meaning in the context of the relevant art and are not to be construed as ideal or excessively formal in meaning unless expressly defined herein.

FIG. 1 illustrates the schematic configuration of a cutting system according to a preferred embodiment of the present invention; FIG. 2 is a left side view of the cutting system shown in FIG. 1; FIG. 3 is a right side view of the cutting system shown in FIG. 1; and FIG. 4 schematically illustrates pathways of conveying a subject to be processed, a product and scrap.

The cutting system 1 according to a preferred embodiment of the present invention is an apparatus for divisionally forming products P from a subject F to be processed by cutting the subject F. Referring to FIGS. 1 to 4, the cutting system 1 may include: a feed unit 10 to sequentially supply a plurality of pre-loaded trays T; a loading unit 20 to load the tray supplied from the feed unit 10 with a subject to be processed F ("subject"); a storage unit 30 to load the plurality of trays loaded with the subjects F in multiple stages to temporally store the same, followed by sequentially re-supplying the subjects in accordance with a change in formation of the product P; a machining unit 40 to cut the subject F delivered from the storage unit 30 so as to form the product P; and a recovery unit 50 that measures a weight of the product P formed in the machining unit 40, and recovers the product P and the tray T, respectively.

FIG. 5 illustrates a schematic configuration of the feed unit shown in FIG. 2; and FIG. 6 is a view illustrating a method for conveying a tray from the feed unit to the loading unit, as well as a method for loading the tray conveyed to the loading unit with a subject to be processed.

The feed unit 10 may be provided to store and supply a plurality of trays T. For example, as shown in FIG. 5, the feed unit 10 may be provided with: a first tray loader 12 that loads the plurality of trays T in multiple stages or sequentially discharges the trays T; and a first tray lift 14 that moves the trays T discharged from the first tray loader 12 up and down in a thickness direction or conveys the same in a horizontal direction (e.g.: a longitudinal width direction).

As shown in FIG. 5, the tray T may have a stepped structure in which a locking jaw J at a side is protruded in a stepped form to obtain a cross sectional area narrower at the bottom than the top, as well as a seating groove G at the top surface of the tray T, which is recessed and formed in a shape corresponding to the bottom surface of the tray T. Accordingly, as shown in FIG. 5, by seating the bottom surface of any one tray T positioned at the top side on the seating groove G of another one tray T positioned at the bottom side, the plurality of trays T may be loaded in multiple stages in the thickness direction.

Further, as shown in FIG. 5, the tray T may further have a guide hole H perforated in the thickness direction in order to pass a laser beam penetrating the subject F when laser-cutting the subject F. The guide hole H may protect the tray T from being damaged by the laser beam penetrating the subject F.

As shown in FIG. 5, the first tray loader 12 may include a first fixing jig 12a to fix and support the plurality of trays T loaded in multiple stages in the thickness direction, and a first jig conveyer 12b coupled to the first fixing jig 12a such that the first fixing jig 12a can be reciprocally conveyed in a horizontal direction of the tray T (e.g.: a longitudinal width direction of the tray 1).

The first fixing jig 12a is preferably provided to support the locking jaw J of the tray T in a lower direction, but is not limited thereto.

The first jig conveyer 12b is preferably configured of a cylinder device, but is not limited thereto.

The number of the first fixing jig 12a and the first jig conveyer 12b is not particularly limited. For example, as shown in FIGS. 5 and 6, a plurality of first fixing jigs 12a and the first jig conveyers 12b may be mounted by a predetermined interval in a horizontal direction of the tray T (e.g.: a transversal width direction of tray T), wherein a pair of the above components can be arranged in bilateral symmetry between the trays T.

With regard to the first fixing jig 12a and the jig conveyer 12b, as shown in FIG. 5, when the first fixing jig 12a is conveyed by the first jig conveyer 12b in order to support the locking jaw J of the tray T positioned in the lowermost layer ("lowermost tray") among the plurality of trays T, the first fixing jig 12a may fix the lowermost tray T and the trays T loaded in multiple stages on top of the lowermost tray T in a state of lifting these trays T by a predetermined height from the ground.

As shown in FIG. 5, the first tray lift 14 may include: first tray lift rollers 14a which are provided to be conveyable in a horizontal direction (e.g.: a longitudinal width direction) while supporting the tray T; and a first lift member 14a to move the first tray lift rollers 14a up and down. The lift rollers 14a are preferably mounted by a predetermined interval in the longitudinal width direction of the tray T, but are not limited thereto. The first lift member 14b is preferably configured of a cylinder device, but is not limited thereto.

Hereinafter, referring to FIG. 5, a method for delivering the trays T loaded in the first tray loader 12 to the first lift rollers 14a will be described.

First, the first lift member 14b may move the first lift rollers 14a upward so that the first lift rollers 14a can support the lowermost tray T.

Next, the first jig conveyer 12b may convey the fixing jig 12a to be spaced apart from the lowermost tray T, thereby releasing the trays T fixed by the first fixing jig 12a.

Hereinafter, the first lift member 14b may move the first lift rollers 14a and the trays T supported by the first lift rollers 14a downward so that the locking jaw J of the tray T in a layer immediately above the lowermost tray T is positioned at a height corresponding to the first fixing jig 12a.

Next, the first jig conveyer 12b may convey the first fixing jig 12a so that the first fixing jig 12a supports the locking jaw J of the tray T in the upper layer ("upper tray") among the plurality of trays T. Then, the upper tray T and other trays loaded in multiple stages on top of the upper tray T may be fixed by the first fixing jig 12a.

Thereafter, the first lift member 14a may move the first lift rollers 14a downward so that the first lift rollers 14a are positioned at the same height as the first fixing rollers 60 described below. Then, the lowermost tray T may descend along the first lift rollers 14a and thus be separated from the other trays T still fixed by the first fixing jigs 12a.

As such, when the lowermost tray T is delivered to the first lift rollers 14a, the first lift rollers 14a may be rotatably driven to convey the tray T delivered from the first tray loader 12 in a longitudinal width direction and deliver the same to the first fixing rollers 60. As shown in FIG. 5, the first fixing rollers 60 are rollers fixed and mounted between the feed unit 10 and the loading unit 20 by a predetermined integral in a horizontal direction (e.g.: a longitudinal width direction) of the tray T, and may be provided to convey the tray T delivered from the first lift roller 14a of the feed unit 10 toward the second lift rollers 22a of the loading unit 20 described below.

The first fixing rollers 60 may convey the tray T delivered from the first lift rollers 14a in the longitudinal width direction and thus deliver the same to the second lift rollers 22a. Therefore, as shown in FIG. 6, the tray T discharged from the feed unit 10 may be supplied to the loading unit 20 by the first fixing rollers 60.

FIG. 7 illustrates a schematic configuration of the loading unit shown in FIG. 2; FIG. 8 is a view illustrating a method for conveying the tray in which the subject was loaded to the storage unit.

The loading unit 20 may be provided to load the tray T delivered from the first fixing rollers 60 with the subject F.

For example, as shown in FIGS. 7 and 8, the loading unit 20 may include: a second tray lift 22 that moves the tray T up and down in a thickness direction or conveys the same in a horizontal direction (e.g.: longitudinal width direction); a first shuttle 24 in which the tray T delivered from the second tray lift 22 is seated; and a first shuttle conveyer 26 that reciprocally conveys the first shuttle 24 along a predetermined conveying pathway.

As shown in FIG. 7, the second tray lift 22 may include: second lift rollers 22a which are provided to support the tray T and convey the same in a horizontal direction (e.g.: a longitudinal width direction); and a second lift member 22b to move the second lift rollers 22a up and down. The second lift rollers 22a and the second lift member 22b may have the same structures as those of the first lift rollers 14a and the first lift member 14b, respectively. Therefore, a detailed description thereof will be omitted.

As shown in FIG. 7, the first shuttle 24 may include: a through-hole 24a perforated to pass the second lift rollers 22a therethrough; a seating groove 24b in which the tray T is seated; and a rail groove 24c which is slidably mounted on a first rail 26a of the first shuttle conveyer 26 described below.

Hereinafter, referring to FIG. 7, a method for seating the tray T in the first shuttle 24 will be described.

First, when the tray T delivered from the first fixing rollers 60 is seated on the second lift rollers 22a, the second lift member 22b may move the second lift rollers 22a downward.

Next, the second lift member 22b may move the second lift rollers 22a and the tray T seated on the second lift rollers 22a downward so that the second lift rollers 22a pass through the through-hole 24a and then are disposed at a lower height as compared to the second shuttle 24a, and so that the tray T is separated from the second lift rollers 22a while being seated on the seating groove 22a.

Thereafter, as shown in FIG. 7, the subject F may be loaded on a predetermined site of the tray T seated in the first shuttle 24 by a worker W, but is not limited thereto. That is, the subject F may also be automatically loaded on the tray T by any automatic feeding apparatus.

Meanwhile, a shape of the subject F is not particularly restricted. For example, as shown in FIG. 4, the subject F may be configured in a rectangular shape having a predetermined transverse width and longitudinal width.

Such a loading position of the subject F is not particularly limited. For example, as shown in FIGS. 6 and 7, the subject F may be loaded on a top surface of the tray T so that the subject F covers the guide hole H while predetermined cut lines ("cut lines") E face the guide hole H. Herein, the cut line E refers to an imaginary (or virtual) line characterized in that the subject F is cut with a laser to divisionally form a sheet type product P having a predetermined transverse width and longitudinal width by irradiating the subject F with a laser beam along the cut line E, and may be determined to form a closed loop corresponding to an outline of the product P. The cut line E may be set in plural by a predetermined interval so that a plurality of products can be divisionally formed from the subject F.

A construction of the first shuttle conveyer 26 is not particularly restricted. For example, as shown in FIGS. 7 and 8, the first shuttle conveyer 26 may extend from the loading unit 20 to the storage unit 30 described below, and may include: a first rail 26a on which a rail groove 24c of the first shuttle 24 is slidably mounted; and a first drive member 26b to reciprocally convey the first shuttle 24 along the first rail 26a.

Further, a construction of the first drive member 26b is not particularly restricted. For example, as shown in FIGS. 7 and 8, the first drive member 26b may include a drive motor 26c to provide driving force; a first sprocket 26d axially coupled to a rotational shaft of the drive motor 26c; a second sprocket 26e which is mounted to be spaced apart from the first sprocket 26d toward the feed unit 10 by a predetermined distance; a chain which rotates along the first sprocket 26d to turn the second sprocket 26e while being coupled to the first sprocket 26d and the second sprocket 26e, so as to form an endless track; and a fixing tap 26g to connect the first shuttle 24 to a predetermined site of the chain 26f. The first drive member 26b may convey the first shuttle 24 from the loading unit 20 to the storage unit 30 or from the storage unit 30 to the loading unit 20, based on a rotational direction of the drive motor 26c.

Because of the provided first shuttle conveyer 26, as shown in FIG. 8, when the subject F is loaded on the tray T seating on the first shuttle 24, the first drive member 26b may convey the first shuttle 24 and the tray T seated thereon toward the storage unit 30 along the first rail 26a and then deliver the same to the storage unit 30 so that the tray T is delivered to the storage unit 30.

FIG. 9 illustrates a schematic configuration of the storage unit shown in FIG. 3; and FIGS. 10 and 11 illustrate a method for conveying the tray discharged from the storage unit to the machining unit.

The storage unit 30 may be mounted to be spaced apart from the loading unit 20 by a predetermined distance in a horizontal direction of the tray T (e.g.: a transverse width direction) so as to receive the first shuttle 24 conveyed along the first rail 26a by the first drive member 26b.

A construction of the storage unit 30 is not particularly restricted. For example, as shown in FIG. 9, the tray T may include: a third tray lift 32 that moves the tray T up and down in a thickness direction or conveys the same in a horizontal direction; and a second tray loader 34 that loads the plurality of trays T delivered from the third tray lift 32 in multiple stages or discharges the trays T in sequential order.

As shown in FIG. 9, the third tray lift 32 may include third lift rollers 32a provided to support the tray T and convey the same in the horizontal direction (e.g.: a longitudinal width direction), and a third lift member 32b to move the third lift rollers 32a up and down. The third lift rollers 32a and the third lift member 32b have the same structures as those of the first lift rollers 14a and the first lift member 14b, respectively. Therefore, a detailed description thereof will be omitted.

Further, as shown in FIG. 9, the second tray loader 34 may include: a second fixing jig 34a to fix and support the trays T; and a second jig conveyer 34b coupled to the second fixing jig 34a in order to convey the second fixing jig 34a in a horizontal direction of the tray T (e.g.: a longitudinal width direction).

The second fixing jig 34a is preferably provided to support a locking jaw J of the tray T in a lower direction, but is not limited thereto.

The second jig conveyer 34b is preferably configured of a cylinder device, but is not limited thereto.

The number of second fixing jig 34a and the second jig conveyer 34b described above, respectively, is not particularly limited. For example, as shown in FIGS. 9 and 10, a plurality of second fixing jigs 34a and second jig conveyers 34b, respectively, may be mounted by a predetermined interval in a horizontal direction of the trays (e.g.: a transverse width direction), wherein a pair of the above components can be arranged in bilateral symmetry between the trays T.

Hereinafter, referring to FIG. 9, a method for loading the tray T in the second tray loader 34 will be described.

First, when the first shuttle reaches a mounting site of the third tray lift 32, the third lift member 32b may move the third lift rollers 32a to a height on which the second fixing jig 34a is mounted, so that the third lift rollers 32a can pass through the through-hole 24a of the first shuttle 24. Then, the tray T loaded with the subject F is seated on the third lift rollers 32a while the tray T is separated from the seating groove 24b of the first shuttle 24 and then moves upward along the third lift rollers 32a.

Next, the second jig conveyer 34b may convey the second fixing jig 34a so that the second fixing jig 34a can support the locking jaw J of the tray T. Then, the tray T may be fixed while being lifted from the ground to a predetermined height by the second fixing jig 34a. Further, the third lift member 32b may move the third lift rollers 32a downward so that the third lift rollers 32a are separated from the tray T and disposed at a lower height than the first shuttle 24 after passing through the through-hole 24a of the first shuttle 24. Thereafter, as shown in FIG. 6, the first shuttle conveyer 26 may convey the first shuttle 24 separated from the tray T toward the loading unit 20, thereby returning the same to the loading unit 20. As such, the first shuttle 24 returned to the loading unit 20 may receive another tray T newly supplied from the feed unit 10 to be seated therein.

Further, when a new tray T is conveyed from the loading unit 20 by the first shuttle 24, the third lift rollers 32a may move the new tray T upward such that the new tray T supports the tray T already fixed to the second fixing jig 34a in the lower direction. The second fixing jig 34a may be operated to support a locking jaw J of the new tray T in a state in which the tray already fixed to the second fixing jig 34a is supported by the new tray T. According to the above processes, the second tray loader 34 may be loaded with the plurality of trays T.

Meanwhile, as shown in FIG. 8, a process of supplying the tray T loaded in the first tray loader 12 of the feed unit 10; a process of loading the tray T supplied to the loading unit 20 with a subject to be processed F; a process of conveying the tray T loaded with the subject F to the storage unit 30; and a process of loading the second tray loader 34 of the storage unit 30 with the tray T conveyed to the storage unit 30 are preferably and repeatedly implemented until all trays T loaded in the first tray loader 12, in a state in which the trays T are loaded with the subjects F, are loaded to the second tray loader 34.

Further, according to the same principle as the first tray loader 12 and the first tray lift 14, the third tray lift 32 and the second tray loader 34 may be driven to deliver the plurality of trays T already fixed to the second fixing jig 34a to the third lift rollers 32a one by one in sequential order.

First, as shown in FIG. 9, the third lift member 32b may move the third lift rollers 32a upward so that the third rollers 32a support the tray T in the lowermost layer ("lowermost tray") among the trays T fixed by the second fixing jig 34a.

Next, the second jig conveyer 34b may convey the second fixing jig 34a to be spaced apart from the lowermost tray T so that the trays T fixed by the second fixing jig 34a are released.

Thereafter, the second lift member 32b may move the third lift rollers 32a and the trays T supplied by the third lift rollers 34a downward so that a locking jaw J of the tray T in a layer immediately above the lowermost tray T ("upper tray") is positioned at a height corresponding to the second fixing jig 34a.

Then, the second jig conveyer 34b may convey the second fixing jig 34a so that the second fixing jig 34a supports the locking jaw J of the upper tray T among the plurality of trays T. Then, the upper tray T and the trays T loaded in multiple stages on top of the upper tray T may be fixed by the second fixing jig 34a.

Thereafter, the third lift member 32b may move the third lift rollers downward so that the third lift rollers 32a are positioned at the same height as the second fixing rollers 70 described below. Then, the lowermost tray T descends along the third lift rollers 32a, thereby being separated from the remaining trays T still fixed to the second fixing jigs 34a.

The third lift rollers 32a disposed at the same height as the second fixing rollers 70 in a state in which the tray T is seated thereon may be rotatably driven to convey the tray T in a longitudinal width direction and thus deliver the same to the second fixing rollers 70. As shown in FIG. 8, the second fixing rollers 70 are rollers fixed and mounted by a predetermined interval in a horizontal direction of the tray T (e.g.: a longitudinal width direction) at a stand-by site of the tray T positioned between the storage unit 30 and the machining unit 40, which are provided to convey the tray T delivered from the third lift rollers 32a of the storage unit 30 toward fourth lift rollers 42a of the machining unit 40 described below.

The second fixing rollers 70 may convey the tray T delivered from the third lift rollers 32a in a longitudinal width direction and thus deliver the same to the fourth lift rollers 42a. Accordingly, as shown in FIGS. 10 and 11, the tray T discharged from the storage unit 30 is in a stand-by state for a predetermined time while being seated on the second fixing rollers 70 and then may be delivered to the machining unit 40 by the second fixing rollers 70. As such, a process of delivering the tray T loaded in the second tray loader 34 to the machining unit 40 may be repeatedly implemented in accordance with a change in formation of products P by laser-cutting the subject F in the machining unit 40. That is, whenever laser-cutting of the subject F loaded in any one tray T in the machining unit 40 is completed, a tray T next to (following) the above tray T would be further supplied from the storage unit 30 to the machining unit 40. As a result, the cutting system 1 may speedily supply the trays T loaded with subjects to be processed in accordance with a progress in formation of products, thereby improving productivity of the products P.

FIG. 12 illustrates a schematic configuration of the machining unit shown in FIG. 3; and FIG. 13 illustrates a method for formation of a product by laser-cutting the subject and a method for recovery of the same.

The machining unit 40 may be provided to cut the subject F delivered from the second fixing rollers 70 with a laser and thus form a product P. For example, as shown in FIGS. 12 and 13, the machining unit 40 may include: a fourth tray lift 42 that moves the tray T up and down or conveys the same in a horizontal direction (e.g.: a longitudinal width direction); a second shuttle 44 in which the tray T delivered from the fourth tray lift 42 is seated; a barcode reader 46 to collect information on the subject F by reading a barcode pre-marked on the subject F seated in the second shuttle 44; a laser machine 48 to conduct laser-cutting of the subject F seated in the second shuttle 44 to produce the product P; and a second shuttle conveyer 49 to reciprocally convey the second shuttle 44 along a predetermined conveying pathway so that the second shuttle 44 can pass through the barcode reader 46 and the laser machine 48.

Although the machining unit 40 was described as forming a product by laser-cutting the subject F, the present invention is not limited thereto. That is, the machining unit 40 may be provided to cut and process the subject F by means of a cutter having a cutting blade (not shown) or other cutting members with different structures. For convenient explanation, hereinafter, a case where the subject F undergoes laser-cutting will be exemplified to describe the present invention.

As shown in FIG. 12, the fourth tray lift 42 may include: fourth lift rollers 42a provided to support a tray T and convey the same in a horizontal direction (e.g.: a longitudinal width direction); and a fourth lift member 42b to move the fourth lift rollers 42a up and down.

As shown in FIG. 12, the second shuttle 44 may have a though-hole 44a provided to pass the fourth lift rollers 42a therethrough; a seating groove 44b in which the tray T is seated; and a rail groove 44c slidably mounted on the second rail 49a.

When the tray T is delivered to the fourth lift rollers 42a by the second fixing rollers 70, the fourth lift member 42b may move the fourth lift rollers 42a downward. Then, the fourth lift rollers 42a pass through the through-hole 44a and then are disposed at a lower height than the second shuttle 44, while the tray T is separated from the fourth lift rollers 42a and seated in the seating groove 44b.

A construction of the second shuttle conveyer 49 is not particularly restricted. For example, as shown in FIGS. 12 and 13, the second shuttle conveyer 49 may extend from the machining unit 40 to the recovery unit 50 described below, and may include: a second rail 49a on which the rail groove 44c of the second shuttle 44 is slidably mounted; and a second drive member 49b that reciprocally conveys the second shuttle 44 along the second rail 49a.

Further, a construction of the second drive member 49b is not particularly restricted. For example, as shown in FIGS. 12 and 13, the second drive member 49b may include: a drive motor 49c to provide driving force; a first sprocket 49d axially coupled to a rotational shaft of the drive motor 49c; a second sprocket 49e which is mounted to be spaced apart from the first sprocket 49d toward the recovery unit 50 by a predetermined distance; a chain 49f which rotates along the first sprocket 49d to turn the second sprocket 49e while being coupled to the first sprocket 49d and the second sprocket 49e so as to form an endless track; and a fixing tap 49g to connect the second shuttle 44 to a predetermined site of the chain 49f. The second drive member 49b may convey the second shuttle 44 from the machining unit 40 to the recovery unit 50 or from the recovery unit 50 to the machining unit 40 based on a rotational direction of the drive motor 49c.

Because of the provided second shuttle conveyer 49, as shown in FIG. 13, the second drive member 49b may convey the second shuttle 44 and the tray T seated thereon toward the recovery unit 50 along the second rail 49a so that the tray T loaded with the subject F passes through the barcode reader 46 and the laser machine 48 in order, and is delivered to the recovery unit 50.

As shown in FIG. 13, the barcode reader 46 may be installed at a predetermined site on a conveying pathway of the second shuttle 44 so that a barcode of the subject F loaded on the tray conveyed toward the recovery unit 50 is read to collect information on preparation of the subject F and other information.

Further, as shown in FIG. 13, the laser machine 48 may be mounted on the second shuttle conveying pathway so that the subject F conveyed along the recovery unit 50 is cut with a laser along predetermined cut lines E to form a plurality of products by a predetermined interval in the subject F. Specifically, the laser machine 48 is preferably installed between the barcode reader 46 and the recovery unit 50 so that the subject F with the barcode read by the barcode reader can be cut by the laser. As shown in FIG. 13, when the subject F is cut with the laser by the laser machine 48, the subject F may be divided into a plurality of products P and a residue of the subject F remaining after formation of the products P, that is, scrap S. In particular, the scrap S may include pores X, which are empty spaces formed due to separation of the products P from the subject F and are arranged at the same interval as an interval between the products P.

FIG. 14 illustrates a schematic configuration of the recovery unit shown in FIG. 2; and FIG. 15 illustrates a method for measuring a weight of the product and a method for recovery of the tray, the product and the scrap.

The recovery unit 50 may be provided to execute a process of measuring a weight of the product P, and a process of recovering the product P, scrap S and tray T, respectively. The recovery unit 50 may be installed to be spaced apart from the machining unit 40 by a predetermined distance in a horizontal direction (e.g.: a transverse width direction) of the tray T so that the tray T conveyed along the second rail 49a by the second drive member 49b and the product P and scrap S seated in the tray T can be delivered.

A construction of the recovery unit 50 is not particularly restricted. For example, as shown in FIGS. 14 and 15, the recovery unit 50 may include: a product unloader 51 that separates the product P formed on the subject F from the scrap S and then conveys the same; a weight measurement member 52 to measure a weight of the product P delivered from the product unloader 51; a product recovery device 53 to recover the weight-measured product P; a loading container 54 in which the products P recovered by the product recovery device 53 are loaded; a scrap unloader 55 to recover the scrap S of the subject F; a scrap container 56 in which the scrap S delivered by the scrap unloader 55 is loaded; and a fifth tray lift 57 that moves the tray T up and down in a thickness direction or conveys the same in a horizontal direction (e.g.: a longitudinal width direction).

The product unloader 51 may be installed at a predetermined site of the conveying pathway of the second shuttle 44. The product unloader 51 may include at least one vacuum adsorption pad to adsorb the product P under vacuum. As shown in FIG. 13, the product unloader 51 may take and convey the product P passing the predetermined site of the conveying pathway of the second shuttle 44, and thus seat the product in the weight measurement member 52.

The weight measurement member 52 may be provided to measure a weight of the product P delivered from the product unloader 51. For example, the weight measurement member 52 may consist of load cells capable of measuring a weight of the product P.

The product P weight-measured by the weight measurement member 52 may be loaded in the product container 54 after recovery according to the product recovery device 53. The product recovery device 53 is preferably configured of a conveyer without limitation thereto.

In order to deliver the product P seated in the weight measurement member 52 to the product loading container 54 via the product recovery device 53, the recovery unit 50 may further include: a second product unloader 58 that delivers the product P seated in the weight measurement member 52 to the product recovery device 53; and a third product unloader 59 that loads the product loading container 54 with the product P passing the second product recovery device 53. In this case, the second product unloader 58 and the third product unloader 59, respectively, may have at least one vacuum adsorption pad 59a capable of adsorbing the product P under vacuum (see FIG. 2).

The scrap unloader 55 may be installed at a predetermined site on the conveying pathway of the second shuttle 44. The scrap unloader 55 may have at least one vacuum adsorption pad 55a capable of adsorbing the scrap S under vacuum (see FIG. 2). As shown in FIG. 15, the scrap unloader 55 may take and convey the scrap S from the tray T seated in the second shuttle 44 which passes through a predetermined site of the conveying pathway of the second shuttle 44, and then load the scrap loading container 56 with the scrap S.

As shown in FIG. 14, the firth tray lift 57 may include fifth lift rollers 57a provided to support the tray T and convey the same in a horizontal direction (e.g.: a longitudinal width direction); and a fifth lift member 57b to move the fifth lift rollers 57a up and down.

As shown in FIG. 14, when the second shuttle 44 reaches a mounting position of the fifth tray lift 57, the fifth lift member 57b may move the fifth lift rollers 57a upward so that the fifth lift rollers 57a pass through a through-hole 44a of the second shuttle 44 while being positioned at the same height as the third fixing rollers 80 described below. Then, the tray T in an empty state after recovery of the product P and the scrap S is seated in the fifth lift rollers 57a from the second shuttle 44 so that the tray T is separated from a seating groove 44b of the second shuttle 44 and ascends along the fifth lift rollers 57a.

As shown in FIG. 15, the fifth lift rollers 57a ascending to a mounting height of the third fixing rollers 80 in a state in which the tray T is seated may be rotationally driven to convey the tray T delivered from the machining unit 40 in a longitudinal width direction and thus deliver the same to the third fixing rollers 80. As shown in FIG. 14, the third fixing rollers 80 are rollers fixed and mounted by a predetermined interval between the recovery unit 50 and the feed unit 10 in a horizontal direction (e.g.: a longitudinal width direction) of the tray T, which are provided to convey the tray T delivered from the fifth lift rollers 57a of the recovery unit 50 toward the first lift rollers 14a of the feed unit 10.

The third fixing rollers 80 may convey the tray T delivered from the fifth lift rollers 57a in the longitudinal width direction and deliver the same to the first lift rollers 14a. Therefore, as shown in FIG. 15, the tray T discharged from the feed unit 10 may be recovered again to the feed unit 10 by the third fixing rollers 80. Further, the feed unit 10 may be driven to re-load the first tray loader 12 with the tray T recovered from the recovery unit 50.

Further, when the tray T is recovered to the feed unit 10 by the fifth lift rollers 57a, the fifth lift member 57b may move the fifth lift rollers 57a downward so that the fifth lift rollers 57a pass through the through-hole 44a and then are arranged at a lower height than the second shuttle 24. Accordingly, as shown in FIG. 15, the second shuttle conveyer 49 may convey the second shuttle 44 free from the tray T toward the machining unit 40, thereby returning the same to the machining unit 40. As such, a tray T newly derived from the storage unit 30 may be seated in the second shuttle 44 returned to the machining unit 40.

As described above, the cutting system 1 may include a cutting process of laser-cutting the subject F to form a product; and a weight-measuring process of measuring a weight of the formed product P, which are successively executable in a single line. According to the cutting system 1, as compared to a case where a cutting apparatus for the cutting process and a weight measurement apparatus for the weight-measuring process are separately provided, installation area and expenses of the system may be reduced so as to shorten a time required for the cutting process and the weight-measuring process, thereby enhancing productivity of the product P.

Further, the cutting system 1 may be provided such that the tray T loaded with the subject F after supplying the same from the feed unit 10 may pass a machining and inspection line of the subject F, including: the loading unit 20; the storage unit 30; the machining unit 40; and the recovery unit 50, thereby automatically recovering the tray T to the feed unit 10, whereby the productivity of the product P may further be improved.

The above description is provided for illustrative purpose only in order to describe the technical spirit of the present invention, and a variety of modifications and variations will be possible by those skilled in the art without departing from essential characteristics of the present invention.

Accordingly, the embodiments disclosed in the present invention are proposed for specifying the technical spirit of the present invention without limitation thereto, and the scope of the present invention is not limited to the above embodiments. The scope of the present invention to be protected should be interpreted by means of the following appended claims, and all technical ideas within the range substantially equal to the claims should be construed as being included in the scope of the present invention.

| [Description of Symbols] | |
| --- | --- |
| 1 Cutting system | |
| 12 First tray loader | 14 First tray lift |
| 20 Loading unit | |
| 22 Second tray lift | 24 First shuttle |
| 26 First shuttle conveyer | |
| 30 Storage unit | |
| 32 Third tray lift | 34 Second tray loader |
| 40 Machining unit | |
| 42 Fourth tray lift | 44 Second shuttle |
| 46 Barcode reader | 48 Laser machine |
| 49 Second shuttle conveyer | |
| 50 Recovery unit | |
| 51 Product unloader | 52 Weight measurement member |
| 53 Product recovery device | 54 Product loading container |
| 55 Scrap unloader | 56 Scrap loading container |
| 57 Fifth tray lift | 58 Second product unloader |
| 59 Third product unloader | |
| 60 First fixing roller | |
| 70 Second fixing roller | |
| 80 Third fixing roller | |
| T Tray | F Subject to be processed (Subject) |
| P Product | S scrap |

What is claimed is:

1. A cutting system for cutting a subject to be processed to form products from the subject, the cutting system comprising:
   a feed unit configured to supply a tray;
   a loading unit configured to receive the tray delivered from the feed unit and load the tray with the subject;

a machining unit configured to receive the tray delivered from the loading unit and cut the subject loaded in the tray to form a product;

a recovery unit configured to receive the tray delivered from the machining unit, measure a weight of the product, and recover the tray and the product; and a storage unit configured to receive the tray delivered from the loading unit, store the tray loaded with the subject, and deliver the tray to the machining unit in accordance with a change in formation of the product, wherein the feed unit includes:

a first tray loader configured to load a plurality of trays including the tray in multiple levels or to discharge the plurality of trays in a sequential order, and a first tray lift configured to move the plurality of trays discharged from the first tray loader up and down and convey the plurality of trays, and wherein the loading unit includes:

a second tray lift configured to move the tray delivered from the first tray lift up and down and convey the tray;

a first shuttle configured to seat the tray delivered from the second tray lift therein; and a first shuttle conveyer configured to convey the first shuttle to the storage unit when the subject in the loading unit is loaded in the tray and to convey the first shuttle to the loading unit when the tray is delivered to the storage unit.

2. The cutting system according to claim 1, wherein the first tray lift includes:

a first lift roller to support and convey the tray; and a first lift member to move the first lift roller up and down.

3. The cutting system according to claim 1, wherein the second tray lift includes:

a second lift roller configured to support and convey the tray delivered from the first tray lift; and a second lift member to move the second lift roller up and down, and wherein the first shuttle includes:

a through-hole defined to pass the second lift roller therethrough; and a seating groove configured to seat the tray seated in the second lift roller, when the tray is separated from the second lift roller when the second lift roller descends and passes through the through-hole.

4. The cutting system according to claim 1, wherein the storage unit includes:

a third tray lift configured to move the tray delivered from the first shuttle up and down and conveys convey the tray; and a second tray loader configured to load the plurality of trays separated from the first shuttle by the third tray lift in multiple levels or discharge the plurality of trays in a sequential order in accordance with a change in formation of the product, and wherein the third tray lift is configured to convey the tray discharged from the second tray loader toward the machining unit.

5. The cutting system according to claim 4, wherein the second tray lift includes:

a third lift roller to support and convey the tray; and a third lift member configured to move the third lift roller up and down to pass through a through-hole of the first shuttle, and wherein the third lift member is configured to move the third lift roller upward so that, when the first shuttle reaches the storage unit, the third lift roller passes through the through-hole and the tray is seated on the third lift roller passing through the through-hole while being separated from a seating groove of the first shuttle.

6. A cutting system for cutting a subject to be processed to form products from the subject, the cutting system comprising:

a feed unit configured to supply a tray;

a loading unit configured to receive the tray delivered from the feed unit and load the tray with the subject;

a machining unit configured to receive the tray delivered from the loading unit and cut the subject loaded in the tray to form a product;

a recovery unit configured to receive the tray delivered from the machining unit, measure a weight of the product, and recover the tray and the product, wherein the machining unit includes:

a fourth tray lift configured to move the tray delivered from a storage unit up and down and convey the tray;

a second shuttle configured to seat the tray delivered from the fourth tray lift therein; and a second shuttle conveyer configured to convey the second shuttle to the recovery unit when the tray in the machining unit is seated in the second shuttle and to convey the second shuttle to the machining unit when the tray is delivered to the recovery unit.

7. The cutting system according to claim 6, wherein the fourth tray lift includes:

a fourth lift roller to support and convey the tray; and a fourth lift member to move the fourth lift roller up and down, and wherein the second shuttle has:

a through-hole defined to pass the fourth lift roller therethrough; and a seating groove configured to seat the tray seated on the fourth lift roller is when the tray is separated from the fourth lift roller when the fourth lift roller descends and passes through the through-hole.

8. The cutting system according to claim 6, wherein the machining unit further includes:

a barcode reader mounted on a conveying pathway of the second shuttle from the machining unit to the recovery unit, the barcode reader being configured to read a barcode pre-marked on the subject and collect information on the subject.

9. The cutting system according to claim 6, wherein the machining unit further includes:

a laser machine mounted on a conveying pathway of the second shuttle from the machining unit to the recovery unit, the laser machine being configured to cut the subject with a laser to divisionally form products from the subject.

10. The cutting system according to claim 6, wherein the recovery unit includes:

a product unloader mounted on a conveying pathway of the second shuttle, the product unloader being configured to separate the product from scrap of the subject remaining after the product forms and to convey the product; and a weight measurement member to measure a weight of the product delivered from the product unloader.

11. The cutting system according to claim 10, wherein the recovery unit further includes:

a product loading container configured to load therein the product delivered from the weight measurement member.

12. The cutting system according to claim 10,
wherein the recovery unit further includes:
a scrap unloader mounted on the conveying pathway of the second shuttle, the scrap unloader being configured to take and convey the scrap; and
a scrap loading container configured to load therein the scrap delivered from the scrap unloader.

13. The cutting system according to claim 12,
wherein the recovery unit further includes:
a fifth tray lift configured to move the tray delivered from the second shuttle up and down and convey the tray.

14. The cutting system according to claim 13,
wherein the fifth tray lift includes:
a fifth lift roller to support and convey the tray; and
a fifth lift member configured to move the fifth lift roller up and down to pass through a through-hole of the second shuttle, and
wherein the fifth lift member is configured to move the fifth lift roller upward so that, when the second shuttle reaches the recovery unit, the fifth lift roller passes through the through-hole, and the tray is seated on the fifth lift roller passing through the through-hole while being separated from a seating groove of the second shuttle.

15. The cutting system according to claim 14, wherein, when the tray separated from the seating groove seats on the fifth lift roller, the fifth lift roller is configured to convey the tray toward the feed unit.

* * * * *